Aug. 9, 1932. H. WEICHSEL 1,870,272

ALTERNATING CURRENT MOTOR

Filed Nov. 7, 1930

Inventor
HANS WEICHSEL
By E.E.Huffman
Att'y.

Patented Aug. 9, 1932

1,870,272

UNITED STATES PATENT OFFICE

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE

ALTERNATING CURRENT MOTOR

Application filed November 7, 1930. Serial No. 493,924.

My invention relates particularly to single-phase multiple speed condenser motors, its object being to provide means for automatically varying the ratio between the voltage induced in the auxiliary or "split-phase" winding and that impressed on this winding when reorganizing the connections of the machine to change its speed. It will be understood that the purpose for variation of the ratio referred to is to so adjust this ratio that when the capacity of the auxiliary circuit is suitably modified (for example, as described in my copending application Serial No. 450,381 filed May 7, 1930 which has now matured into United States Patent No. 1,795,063), the machine may be designed to operate quietly at either speed.

The specific object of my invention is to secure the ratio changes automatically and without providing the switching apparatus which would be necessary if the ratio were changed by changing the connections of the auxiliary circuit to the main inducing winding.

Figure 1:
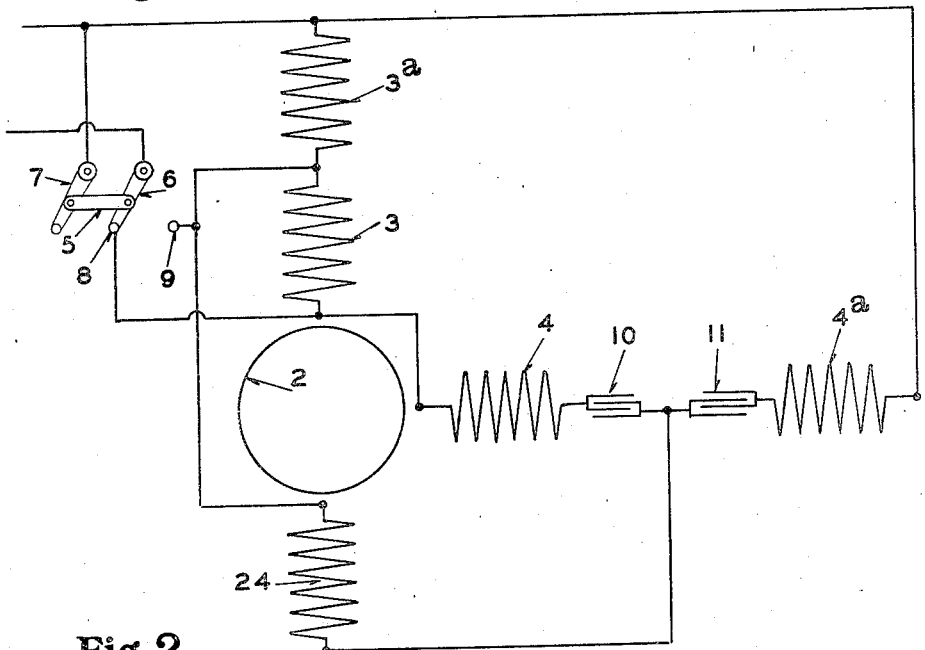
Figure 2:
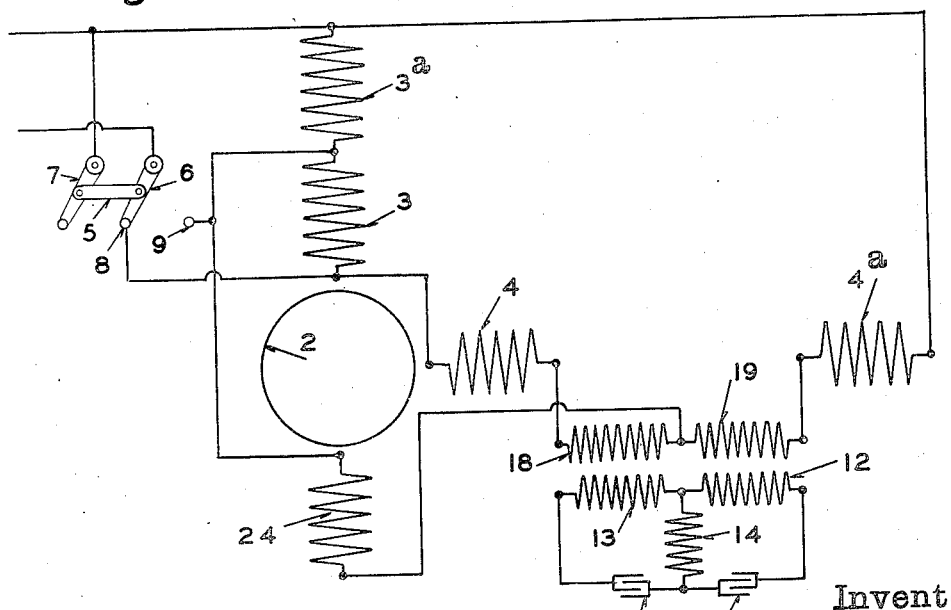

In the drawing, Figure 1 diagrammatically indicates an embodiment of my invention in a multiple speed condenser motor of conventional design; and Figure 2 illustrates an embodiment in such a motor having the capacity regulation means described in my above mentioned application.

Referring to Figure 1, 2 diagrammatically represents the rotor of the machine, the stator of which is provided with a main inducing winding comprising the groups 3 and 3a, and an auxiliary winding displaced 90 electrical degrees from the main winding and comprising the groups 4 and 4a. The inducing windings are so distributed over the stator member that when groups 3 and 3a are connected in parallel, and groups 4 and 4a in parallel, and N-pole stator magnetization is produced which may be of two, four or more poles, but when these winding groups are connected in series the stator produces a 2N-pole magnetization. As will appear from Figure 1, the switch 5 establishes connections whereby the groups of each inducing winding are connected in series with each other when the switch is in the position shown in the Figure, and connects these groups in parallel when blade 6 is placed on contact 9 and blade 7 on contact 8. In each position of the switch the main and auxiliary windings, as a whole, are connected to the line in parallel.

For the purpose of my invention an inducing winding 24 is placed on the stator and positioned coaxially with the main inducing winding. This winding 24, as will appear from the drawing, is connected at one end to the middle point of the main inducing winding, and at the other to the auxiliary circuit at a point between the two condensers 10 and 11 and, therefore, also to the middle point of the auxiliary circuit. It will be apparent that the voltage induced in winding 24 will increase or decrease the total voltage impressed upon the portion of the auxiliary circuit comprising the condenser 10 and the winding 4, depending upon which terminal of the winding 24 is connected to the auxiliary circuit. Winding 24 is an N-pole winding and is therefore, in non-inductive relation with the main inducing winding when the turns of the latter are grouped for 2N-pole magnetization. Consequently winding 24 is entirely ineffective under the latter condition, having no voltage induced therein and being connected between equipotential points.

From the foregoing it will be apparent that, assuming a design which results in the proper ratio of induced to impressed voltage on the auxiliary windings for a quiet operation under a 2-N pole connection of the machine, winding 24 can be so dimensioned and connected as to automatically establish the best ratio under the N-pole connection, having in mind the normal load and other conditions for which the motor is built.

In Figure 1 no means is shown for changing the capacity values of the auxiliary circuit upon change of speed, but Figure 2 illustrates the application of my present invention to the transformer arrangement described in my previous application above referred to, which automatically brings about the desired capacity change.

Describing this latter arrangement here briefly, a three-leg transformer is provided, primary winding 18 being on one outer leg of the transformer and winding 19 being on the other outer leg, these windings being connected in the auxiliary circuit between the stator windings 4 and 4a, as shown. Under the 2N-pole connection of the inducing windings, these primary coils are in series with each other, but in the N-pole connection of the stator windings the primary 19 is in series with winding group 4a and primary 18 in series with winding group 4 with respect to circuits by which these winding groups are connected to the line.

The transformer is provided with three secondary windings 12, 13, and 14, in circuit with which, in the manner shown in the figures, are condensers 15 and 16. The secondary winding 14, which is on the central leg of the transformer is in circuit with each of the other secondary windings through a condenser. The purpose of the arrangement described is that when the stator windings are given their N-pole connection, the primary windings of the transformer, which then magnetize in opposite directions, cause a flux to be set up in the central leg of the transformer and a voltage to be induced in the winding 14, whereby the voltages across the terminals of the condensers 15 and 16 will be increased or decreased, depending upon the direction of connection with the secondary 14, and thus the capacity value of the auxiliary circuit is automatically changed when the number of poles of the machine is changed.

Having fully described my invention, what I claim as new and desire to secure by Letters Patent of the United States is:

1. In a split phase motor, a main inducing winding and a circuit comprising an auxiliary inducing winding displaced from the main inducing winding, means for so grouping the turns of said windings as to produce either an N-pole or a 2N-pole magnetization, a regulating winding on the stator substantially coaxial with the main inducing winding when the turns of the latter are connected for N-pole magnetization, said regulating winding being in non-inductive relation with the main inducing winding when the turns of the latter are connected for 2N-pole magnetization, and being connected and arranged to impress a voltage on the circuit embodying the auxiliary winding when the turns of the main and auxiliary windings are grouped to produce N-pole magnetization.

2. In a split phase motor, a main inducing winding and a circuit comprising an auxiliary inducing winding displaced from the main inducing winding, means for so grouping the turns of said windings as to produce either an N-pole or a 2N-pole magnetization, a regulating winding on the stator substantially coaxial with the main inducing winding and connected between the mid-point of the main inducing winding and the mid-point of the auxiliary winding circuit, said regulating winding being in non-inductive relation with the main inducing winding when the turns of the latter are connected for 2N-pole magnetization.

3. In a split phase motor, a main inducing winding and an auxiliary inducing winding displaced therefrom and connected to the line in parallel therewith, means for so grouping the turns of said windings as to produce either an N-pole or a 2N-pole magnetization, two condensers in the auxiliary winding circuit, a regulating winding on the stator substantially coaxial with the main inducing winding and connected between the mid-point of the main inducing winding and such point of the auxiliary winding circuit as will provide two current paths therefrom to the main inducing winding, each of said paths including a condenser and a part of the auxiliary winding.

In testimony whereof, I hereunto affix my signature, this 4th day of November, 1930.

HANS WEICHSEL.